Jan. 24, 1928.  
C. E. WOLFERMANN  
1,656,931  
COLLAPSIBLE SEAT  
Filed Nov. 6, 1923  
4 Sheets-Sheet 1
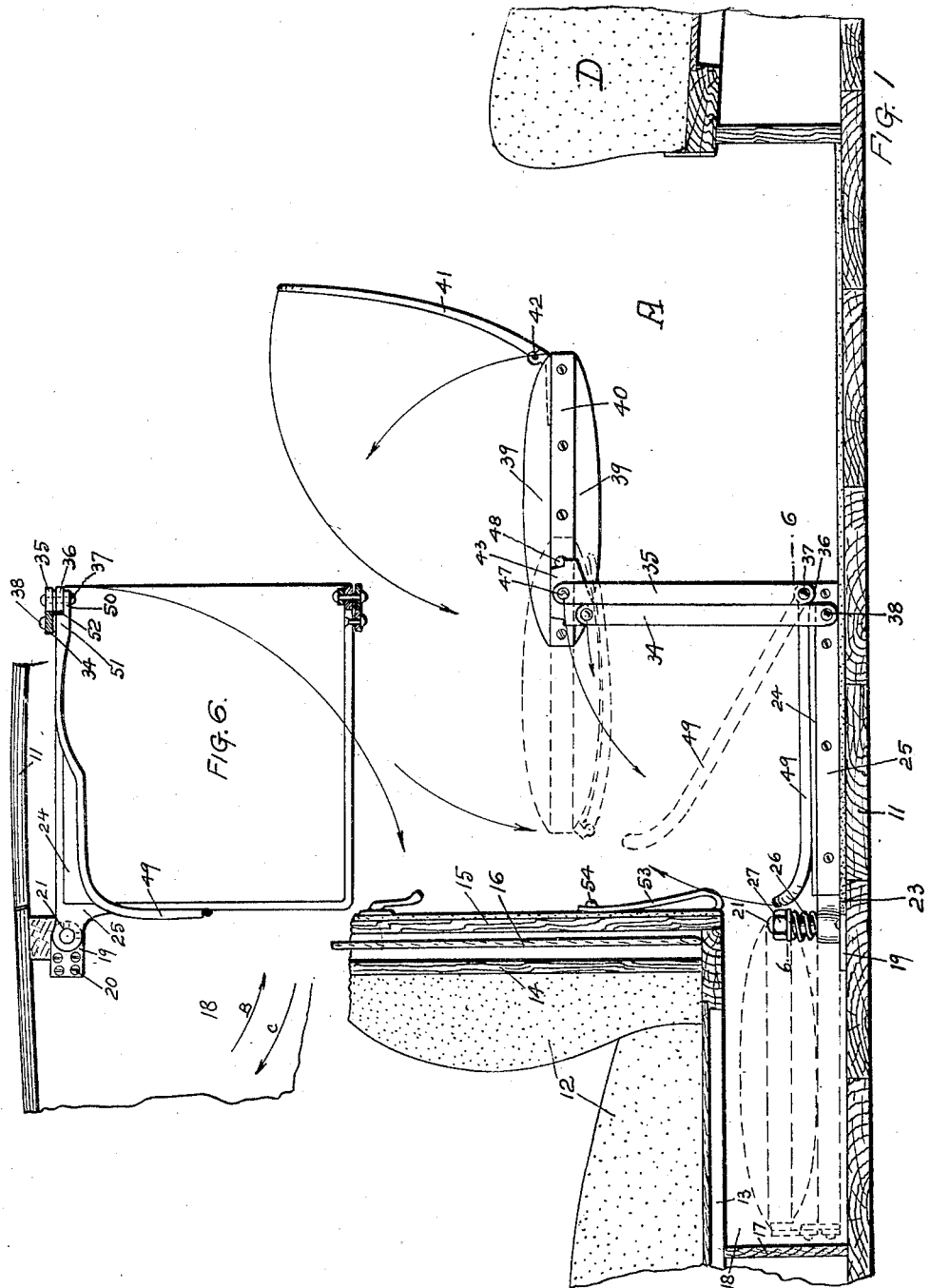

Jan. 24, 1928.
C. E. WOLFERMANN
1,656,931
COLLAPSIBLE SEAT
Filed Nov. 6, 1923
4 Sheets-Sheet 2
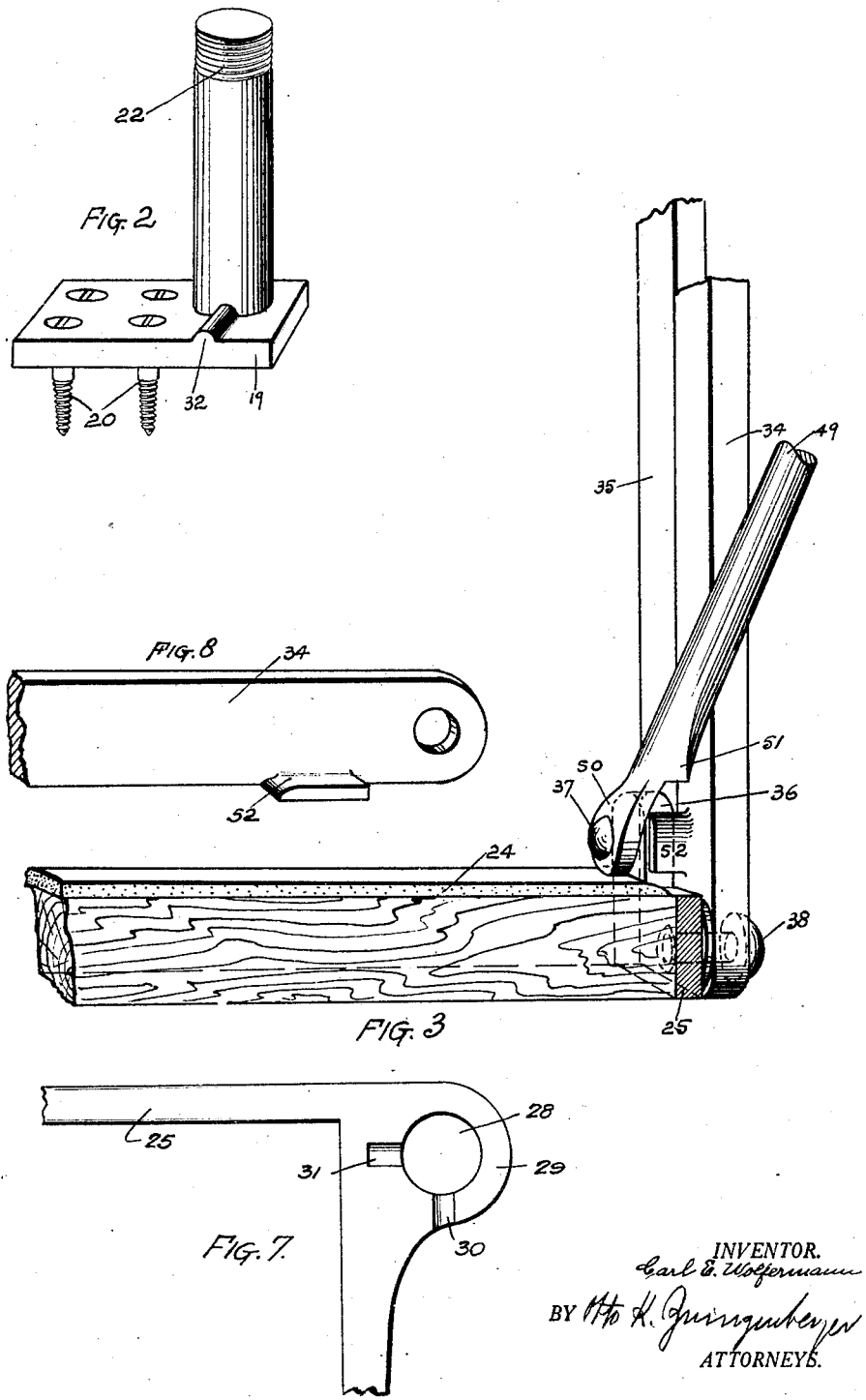

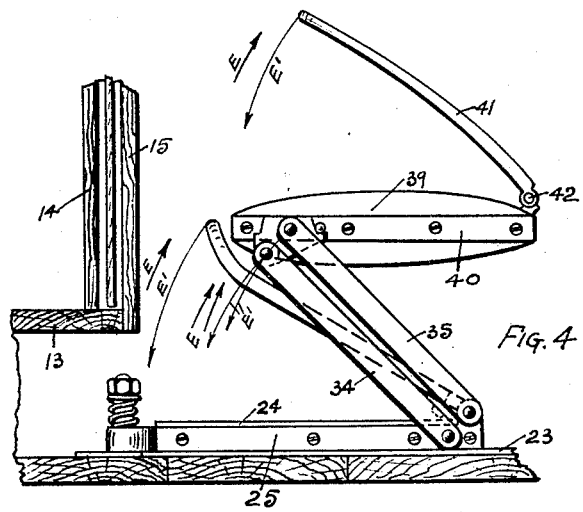
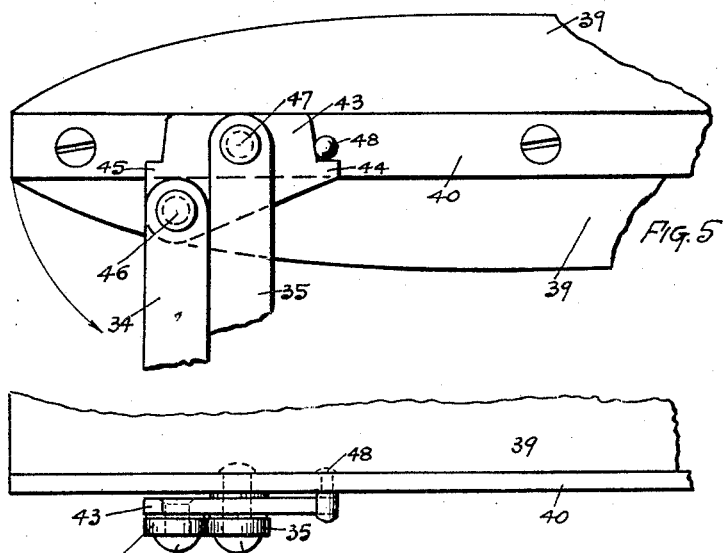
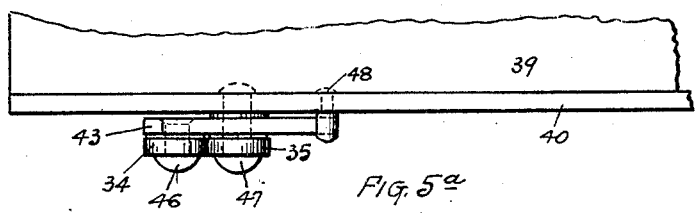

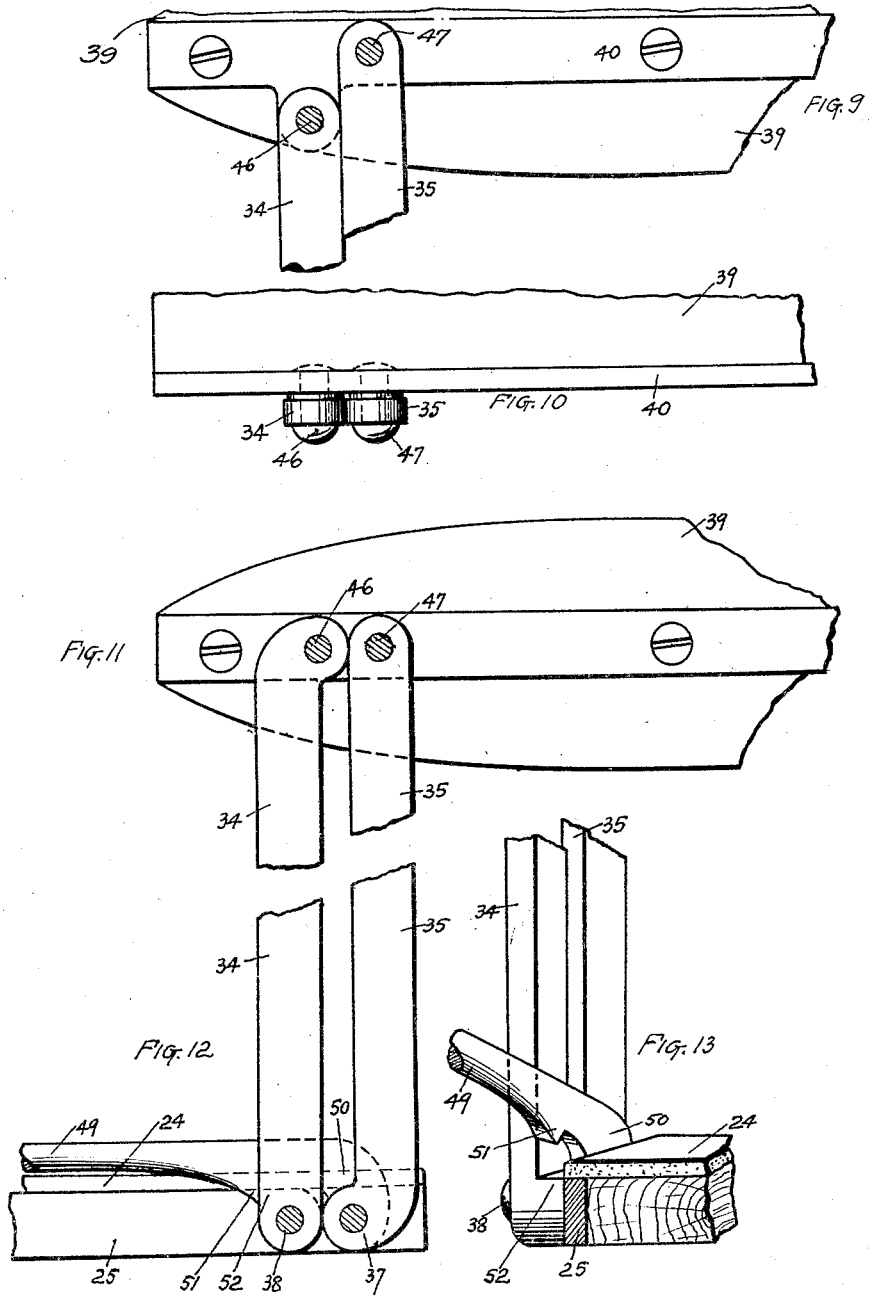

Patented Jan. 24, 1928.

1,656,931

UNITED STATES PATENT OFFICE.

CARL E. WOLFERMANN, OF NEW YORK, N. Y.

COLLAPSIBLE SEAT.

Application filed November 6, 1923. Serial No. 673,175.

This invention relates to an automobile seat and it particularly relates to a collapsible seat, the object of the invention being to provide an exceedingly simple, light and strong seat which can be readily set up or taken down.

It is also an important object of the invention to provide a collapsible automobile seat which in its folded state is secured below the driver's seat and occupies a minimum of space.

Another object of my invention is to provide a collapsible automobile seat which is either removed from, or inserted into, its storage room below the driver's seat by swinging it horizontally, and which is set up, or taken down, in the compartment of the automobile.

It is another object of the invention to provide a collapsible automobile seat which at the passenger's pleasure by a simple turn may be changed into a front or rear seat at will.

It is also an object of the invention to provide a collapsible automobile seat of comparatively inexpensive construction which may be applied to any type of automobile.

With these and other objects in view my invention consists in the construction, arrangement and combination of the various parts of my device, whereby the objects contemplated are attained, as hereinafter more fully set forth, pointed out in the claims, and illustrated in the accompanying drawings, in which Fig. 1 is a longitudinal sectional view of the middle part of an automobile body showing the driver's seat and a rear seat with my new collapsible seat set up between them;

Fig. 2 is a detail view, on a somewhat enlarged scale, of a part of my device acting as a pivot for an elevated seat in the folded state;

Fig. 3 is a detail view, on a somewhat enlarged scale, of a part of the base upon which my collapsible seat is mounted;

Fig. 4 is a detail view illustrating the manner of setting up, or taking down, the seat;

Fig. 5 is an enlarged detail view showing the manner of securing the seat on the braces when set up and Fig. 5ᵃ is a top view illustrating how the braces and the frame with the seat are hinged together;

Fig. 6 is a sectional view on line 6—6 of Fig. 1;

Fig. 7 is a detail view, on a somewhat enlarged scale, illustrating the particular member of the frame of the supporting base by which the hinged connection is effected;

Fig. 8 is a detail view showing on an enlarged scale one of the braces with a lug acting as a part of the locking device.

Figs. 9–13 illustrate certain simplified forms, or modifications of my new collapsible seat involving the general principle of construction.

In the accompanying drawings the numeral 10 denotes, by way of example only, an automobile body of the closed type which in a moderate height above its floor 11 is provided with an elevated driver's seat 12 secured on the platform 13 and on the wall 14. On the platform 13 a wall 15 is erected parallel to wall 14 with a window pane 16 slidingly arranged between said two walls. In connection with bottom 11 and platform 13 the wall 17 forms a storage place 18 of just sufficient dimensions to receive the folded seat as indicated in Fig. 1 by dotted lines.

In the space 18 a plate 19 is secured to the floor 11 by means of screws 20 so that the stud 21, rigidly mounted upon said plate 19 and provided with a screw thread 22 at its upper end, is located within said space 18 approximately below wall 15 and the window 16.

The plate 19 is substantially flush with the carpet 23 on floor 11 so that the base 24, held by the frame 25 hingedly secured to stud 21, is supported in its entire extension. A spring 26 is slipped over stud 21 and a nut 27, engaging screw thread 22, presses the expansion spring 26 upon frame 25 with base 24 so as to hold the same down. The hinged connection of frame 25 with stud 21 is effected by means of a bore 28 in the rounded projection 29 located preferably at that corner of the frame which is the outer when the seat is set up; the frame is furthermore provided with the linear grooves 30 and 31, each of which is parallel to one side of the frame 25 and which both are disposed to each other at an angle of 90 deg. A convex linear elevation, or rib 32 is provided on plate 19 and corresponds in shape to grooves 30 and 31 so as to completely fill the same when said rib 32 is brought to register with either of the said grooves. The rib 32 extends to stud 21 and is disposed parallel to the wall 15, which is substantially vertical to the longitudinal axis of the automobile.

Fig. 1 shows the collapsible seat set up in the compartment A of the automobile, the frame 25 with base 24 being disposed on carpet 23. The collapsible seat consists of a pair of braces in the form of parallel legs 34 and 35 hingedly secured to each of the two sides of the frame which are opposite to each other and parallel to the longitudinal axis of the automobile when the seat is set up. It will be noticed from the Figures 1, 3 and 4 that the hinged connection of bar 35 with frame 25 is made through a lug 36 at the upper rim of frame 25, by means of a bolt 37 rigidly secured to said lug 36, while the bar 34 is hingedly connected to frame 25 by means of a bolt 38 rigidly secured to the same. The bars 34 and 35 are placed closely together, parallel to each other, and are of substantially the same length; at their upper ends they are hingedly joined with the seat in a manner particularly illustrated by Figures 5 and 5ᵃ. The seat 39 is upholstered on both sides and secured to a frame 40 to which the rear support 41 is hingedly connected at 42. A plate 43 with two projections 44 and 45 is interposed between the frame 40 and the upper ends of the bars 34 and 35 and from Fig. 5ᵃ it can be noticed that bar 34 is hingedly joined to the plate 43 by means of the bolt 46 rigidly secured to plate 43, while the bar 35 is hingedly joined to the locking bolt 47 which passes through both plate 43 and frame 40. The hinged connection at the upper ends of the bars 34 and 35 are as much above each other as those at the lower ends. 48 is a projection, rigidly secured to frame 40, acting as a stop in connection with the projections 44 and 45 which are substantially the same distance from the bolt 47.

A U-shaped rail bow 49, having its middle part slightly turned upwardly, is hingedly connected at its ends 50 with the two lugs 36 on their inside by means of the bolt 37 so that lug 36 is interposed between the bar 35 and bow 49. The ends 50 of bow 49, made preferably of a thick or round metal bar, are flattened out for a certain length, this flat end, provided with an opening 50 for the bolt 37, creates with the butt end 51 a space for the lug 52 projecting from bar 34 inwardly towards bow 49 and being slightly edged at its upper part. This lug 52 occupies the space between the lug 36 and butt end 51 completely when the bow is pressed down on bottom 24 as illustrated by Fig. 1 and this edge facilitates pressing down said bow.

Assuming that the collapsible automobile seat is folded and stored in room 18 and that it is desired to use the seat, I take up the curtain 53 attached to the wall 15 and slip it over the pins 54. Then I swing the folded seat outwardly as indicated by arrow B until it is disposed towards the wall of the automobile body 11 as indicated by Fig. 6. Then I seize the rear support 41 and pull it in the direction of the arrow E (Fig. 4), the seat thus getting into the position illustrated by Fig. 4 until it is finally fully set up as illustrated by Fig. 1. When the frame 40 with the seat 39 enters into the position illustrated by Fig. 1, then the bow 49 is in about the inclined position indicated by a dashed line and the parallel bars 34 and 35 are in a practically vertical position, whereupon I press bow 49 downwardly so that its side rails touch the bottom 24, whereas the slightly raised front rail serves as a support for the feet. The frame 49 with the seat 39 is fully secured by the stop 48 resting upon the projection 44.

By pressing bow 49 down upon the bottom 24 the whole construction of the set up seat is locked against collapsing by the lug 52 and the butt end 51 of bow 49; it has been shown above that the flattened ends of the bow 49 leave a certain space which is completely occupied by the lug 52 of bar 34 when bow 49 touches the base 24; if this is the case then the lug 52 is held, like in a vise, by the lug 36 of frame 25 and by the butt-end 51 of bow 49 so that it is impossible for rail 34 to move at all and the set up seat, as illustrated by Fig. 1, represents a rigid system which is absolutely proof against any accident and which does not need to be supported by any rear legs which would only obstruct the space so that the passenger on the rear seat D is at liberty to put his feet at his convenience.

If I want to transform the seat from a front to a rearwardly facing seat, I accomplish this in a moment by simply putting down the rear support 41 and swinging the seat 39, held by the frame 40, around the hinged connection 47 of the latter until the stop 48 rests on projection 45 as indicated by the dashed lines of Figure 1, which also shows that seat 39 is made of such length only as not to shear wall 15.

The construction of my new collapsible seat has also the advantage that there is sufficient space left between two such seats arranged aside of each other to allow the passengers to move freely between the seats. Besides the easy operation of the seat it is also considered a merit of the construction of my new collapsible seat that it does not exert any shearing action on the carpet on the bottom. When the folded seat is stored in space 18 the groove 30 registers with the rib 32 and as soon as I pull on frame 25 to swing same outwardly in direction of arrow B the groove 30 moves off rib 32 and the frame 25 slides over the back of rib 32, thereby lifting the whole folded seat for the height of the rib 32 and taking it off carpet 23 during the swinging movement until the folded seat is entirely out of space 18 at which moment groove 31 registers with rib 32 and the folded seat drops on the carpet 23. It is obvious that by this manner of operation the bottom does not scrape the carpet and it is but natural that the carpet for this reason retains its pleasant appearance for a very much longer time, nor does the carpet need slots for parts of the seat to be operated.

To take down the seat I first raise bow 49 to such a height that the butt end 51 of bow 49 is above the lug 52 and then I press upon the rear support 41 in the direction of the arrows E' until the seat is completely folded, whereupon I swing it in the direction of the arrow C (Fig. 6) into the storage space 18 until it has entirely disappeared within the same. I may then drop curtain 53 and the compartment A does then not reveal any trace of the folded seat and shows only a big free space with the seat D. An inspection of Figure 4 clearly shows that the bars 34 and 35 are always parallel to each other during any step of the operation and owing to the particular hinging connections of the said bars with the bottom and the seat, these latter elements are also parallel to each other at any time during the operation and utilization of the seat. The possibility of transforming the seat at will from a front into a rearwardly facing seat by turning the seat 39 merely 180 deg. around pivot 47, admits also of clearing a passageway for the doors by simply turning the seat for approximately 90 deg. whereby sufficient passageway is gained to conveniently reach the doors or seats.

In the folded state seat 39 rests directly upon the base 24 and requires only very little height so that the storage space 18 is very low which allows the desirable advantage of making the window pane rather high instead of reducing it as is necessary with the seats of this type now in use; my new seat also admits of letting the window down to a very much lower point than is possible in some automobile types of the present time.

Furthermore I wish to point out that the bow 49 offers another element of safety by being used as a foot rest by the passenger, for in this manner the passenger himself automatically keeps the seat locked when set up and thus contributes to his own safety when he puts his feet upon the bow 49 and thus presses the same down upon bottom 24.

I am aware that variations of some details of construction may be resorted to without however changing the principle of construction and operation of my new collapsible seat and therefore I do not restrict myself further than the scope of the appended claims demands. Whenever I speak in these claims of the "bottom" I mean the base 24 including the frame 25 holding the same and whenever I speak of the "seat-board" I mean the seat 39 including frame 40 holding the same. If I speak of the "floor" of the automobile I mean the main bottom of the automobile including the carpet across and above which the base 24 is swinging when motion is imparted to it and with the "front" bar I mean bar 34 and with the "rear" bar the bar 35.

The modification of my new collapsible seat illustrated by the Figures 9-13 is made in case it is not desired to use the new seat alternately as a front and rear seat; in case its use as a rear seat is not considered then the plate 43 can be dispensed with in the construction and the front as well as the rear bar is directly hingedly connected with the frame 40 without however otherwise changing anything in the construction or the operation of my new collapsible seat except that, as stated, the seat 39 can not be turned 180 degrees around itself as is necessary to change the seat from a front into a rearwardly facing seat. Whenever I speak of longitudinal side edges I embrace and refer to the side edges which are parallel to the longitudinal axis of the automobile when the seat is unfolded.

What I claim is:

1. In a collapsible automobile seat adapted to be used in connection with an elevated driver's seat forming an open hollow space below the same to hold the folded seat therein, the combination of a base adapted to be moved substantially horizontally across the floor from below to behind the driver's seat, and vice versa, a lug secured at each longitudinal side edge of the base on the upper side and at the rear thereof, a seat, a plate pivoted to each longitudinal side of the seat and having a projection on its opposite ends, a pair of front and rear bars, of substantially equal length pivoted on opposite sides of the base, the bars of each pair being disposed parallel in close proximity to each other and hingedly connected at their upper ends with the corresponding projection of aforesaid plates, a lug on each front bar projecting inwardly closely in front of the lug on the upper side edge of the base, a stop on each longitudinal side of the seat adapted to rest on either of the projections of the corresponding plate, a locking rail, having flattened ends so as to form butts near the same, pivoted on the inside of the lugs on the upper side edges of the base so as to engage with its butts the inwardly projecting lugs of the front bars when pressed down, and of means, secured below the driver's seat to the platform of the automobile, cooperating with aforesaid base in a lateral horizontal swinging movement.

2. In a collapsible automobile seat adapted to be used in connection with an elevated driver's seat forming a hollow space below the same to hold the seat in its folded form therein, the combination of a stud secured below the driver's seat to the platform of the automobile, elastic holding means secured to said stud, a frame, having at one of its corners a rounded projection with a bore, operatively engaged by aforesaid stud, a base held by aforesaid frame and being adapted to be removed by a lateral swinging motion from below to behind the driver's seat, and vice versa, a lug secured at each longitudinal side edge on the upper side and at the rear thereof, a seat, a plate pivotally secured to each longitudinal side of the seat and having a projection on its opposite ends, a pair of front and rear bars of substantially equal length pivoted on opposite sides of the base, the bars of each pair being disposed parallel in close proximity to each other and being hingedly connected at their upper ends with the corresponding projection of aforesaid plates, a lug on each front bar projecting inwardly in front of the lug on the upper side edge of the base, a stop on each longitudinal side of the seat adapted to rest on either of the projections of the corresponding of the aforesaid plates, and of a locking rail, having flattened ends so as to form butts near the same, pivoted on the inside of the lugs upon the upper side edges of the base so as to engage with its butts the inwardly projecting lugs of the front bars when pressed down to the base.

3. In a collapsible seat of the character as described, the combination comprising a locking system for the seat against a forward and rearward movement in its erected position, said locking system consisting of a lug on each of the upper side edges of the base of the seat, a rear bar hingedly connected to the outside of said lugs, a front bar having a lug inwardly projecting closely in front of the lug on the upper side edges of the base, being hingedly connected to each side of the base closely to and below the rear bar, and of a U-shaped rail, having butts near its ends, hingedly connected with the lug on the upper side edge of the base on the inside of the same and engaging with its butts the lugs of the front bars when pressed down to the bottom.

4. In a collapsible seat of the character as described, the combination comprising a locking system for the seat against a forward or rearward movement in its erected position, said locking system consisting of a lug on each of the upper side edges of the base of the seat, a rear bar hingedly connected to the outside of each of said lugs, a front bar, having an inwardly projecting lug, being hingedly connected to each side of the base closely to and below the rear bar, of a U-shaped rail, having butts near both its ends, hingedly connected with the lug on the upper side edge of the base on the inside of the same, engaging with its butts the lug of the front bar when pressed down to the base and having its center part turned upwardly so as to serve as a foot rest.

5. In an automobile seat, the combination comprising means connecting the seat with the support in such manner as to allow transforming the seat at will into a front or rearwardly facing seat, said connecting means consisting of a pair of bars disposed parallel in close proximity to each other, a seat, a plate interposed between each side of the seat and the upper ends of aforesaid bars, the rear bar being hingedly connected with the seat by a bolt passing through a hole in the plate and being rigidly secured to the seat, the front bar being hingedly secured to the aforesaid plate below the aforesaid hinge connection of the rear bar, a projection each on the opposite ends of aforesaid plate disposed equidistantly from the connection of the rear bar with said plate, a stop pin secured to the seat in a slightly shorter distance from the hinge connection of the rear bar with the aforesaid seat than that of aforesaid projection so as to allow engagement of either projection by the stop pin on the turning over of the seat.

6. As a new article of manufacture, a collapsible seat having a base and being adapted to be forwarded in the folded state from below the driver's seat into its working position on the floor of an automobile, to be erected with its base and seat substantially parallel to the axis of the automobile, to offer a rigid structure protected against collapse during its use and folding in a forward direction with the seat and base in parallel position to each other during this motion, said seat including a plate secured to the floor of the automobile below the driver's seat and having a stud mounted thereon, elevated means secured on the upper side of aforesaid plate in a direction substantially vertical to the axis of the automobile, a base held by a frame with a rounded projection hingedly secured to said stud so as to swing laterally and horizontally from below the driver's seat into its working position in the automobile, two grooves on the underside of aforesaid rounded projection, intersecting at an angle of 90 deg. with each other, a lug on each of the upper side edges of the base of the seat, a pair of bars of substantially equal length, a rear bar hingedly connected to the outside of each of said lugs, a front bar hingedly connected to each side of the base below the hinge connection of and in close proximity to the respective rear bar, having an inwardly projecting lug, a U-shaped rail, having butts near both its ends, hingedly connected with the lugs on the upper side edges of the bottom on the inside of the same, engaging with its butts the lugs of the front bar when pressed down to the base and having its center part raised so as to serve as a foot rest, a seat, a plate interposed between each side of the seat and the upper ends of aforesaid bars, the rear bar being hingedly connected with the seat by a bolt passing through a hole in the plate and being rigidly secured to the seat, the front bar being hingedly secured to the aforesaid plate below the aforesaid hinge connection of the rear bar, a projection on each opposite end of aforesaid plate disposed equidistantly from the connection of the rear bar with said plate and seat, a stop pin secured to the seat in a slightly shorter distance from the hinge connection of the rear bar with the aforesaid seat than that of aforesaid projection so as to allow engagement of either projection by the stop pin on turning the seat.

CARL E. WOLFERMANN.